United States Patent
Yamashita et al.

(10) Patent No.: US 7,336,450 B2
(45) Date of Patent: Feb. 26, 2008

(54) MAGNETIC HEAD WITH OPTIMUM ASPECT RATIO OF UPPER SHIELD LAYER

(75) Inventors: Tomohiro Yamashita, Niigata-ken (JP); Akira Takahashi, Niigata-ken (JP); Shuji Yanagi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 345 days.

(21) Appl. No.: 11/203,687

(22) Filed: Aug. 15, 2005

(65) Prior Publication Data

US 2006/0039088 A1 Feb. 23, 2006

(30) Foreign Application Priority Data

Aug. 20, 2004 (JP) .............................. 2004-240517

(51) Int. Cl.
*G11B 5/33* (2006.01)

(52) U.S. Cl. ...................................... 360/319

(58) Field of Classification Search ................. 360/319
See application file for complete search history.

(56) References Cited

U.S. PATENT DOCUMENTS

| | | | |
|---|---|---|---|
| 5,208,715 A * | 5/1993 | Mowry | 360/319 |
| 5,822,159 A | 10/1998 | Fukuyama et al. | |
| 5,872,691 A | 2/1999 | Fukuyama et al. | |
| 6,275,360 B1 | 8/2001 | Nakamoto et al. | |
| 6,456,466 B1 | 9/2002 | Nakamoto et al. | |
| 6,754,050 B2 * | 6/2004 | Kong et al. | 360/317 |
| 7,126,788 B1 * | 10/2006 | Liu et al. | 360/123 |
| 7,126,790 B1 * | 10/2006 | Liu et al. | 360/126 |
| 7,199,975 B1 * | 4/2007 | Pan | 360/126 |
| 2002/0064006 A1 | 5/2002 | Hasegawa | |
| 2004/0212923 A1 * | 10/2004 | Taguchi | 360/125 |
| 2005/0259356 A1 * | 11/2005 | Han et al. | 360/126 |
| 2006/0209469 A1 * | 9/2006 | Akimoto | 360/319 |

FOREIGN PATENT DOCUMENTS

| | | |
|---|---|---|
| JP | 06-150247 | 5/1994 |
| JP | 2000-235911 | 8/2000 |
| JP | 2001-209915 | 8/2001 |
| JP | 2002-197616 | 7/2002 |
| JP | 2003-085710 | 3/2003 |
| JP | 2003-242613 | 9/2003 |

* cited by examiner

*Primary Examiner*—David Davis
(74) *Attorney, Agent, or Firm*—Brinks Hofer Gilson & Lione (57) ABSTRACT

A magnetic head contains a write magnetic head and a read magnetic head. The write magnetic head includes a lower core layer, an upper core layer arranged over the lower core layer, and a coil layer for applying a magnetic field to the lower and upper core layers. The read magnetic head includes an upper shield layer, a lower shield layer, and a reproducing device arranged between the upper shield layer and the lower shield layer. The upper shield layer has a dimension A in a direction of track width and a dimension B in a direction of height and has an aspect ratio B/A ranging from 0.6 to 1.2. The dimension A ranges from 75 μm to 150 μm.

6 Claims, 8 Drawing Sheets

MAGNETIC HEAD WITH OPTIMUM ASPECT RATIO OF UPPER SHIELD LAYER

This application claims the benefit of priority to Japanese Patent Application No. 2004-240517, filed on Aug. 20, 2004, herein incorporated by reference.

BACKGROUND OF THE INVENTION

1. Field of the Invention

The present invention relates to recording magnetic heads for use typically in floating magnetic heads. More specifically, it relates to magnetic heads which less adversely affect surrounding constitutional members even when a current at a high frequency and/or a high power is applied.

2. Description of the Related Art

Figure 10:
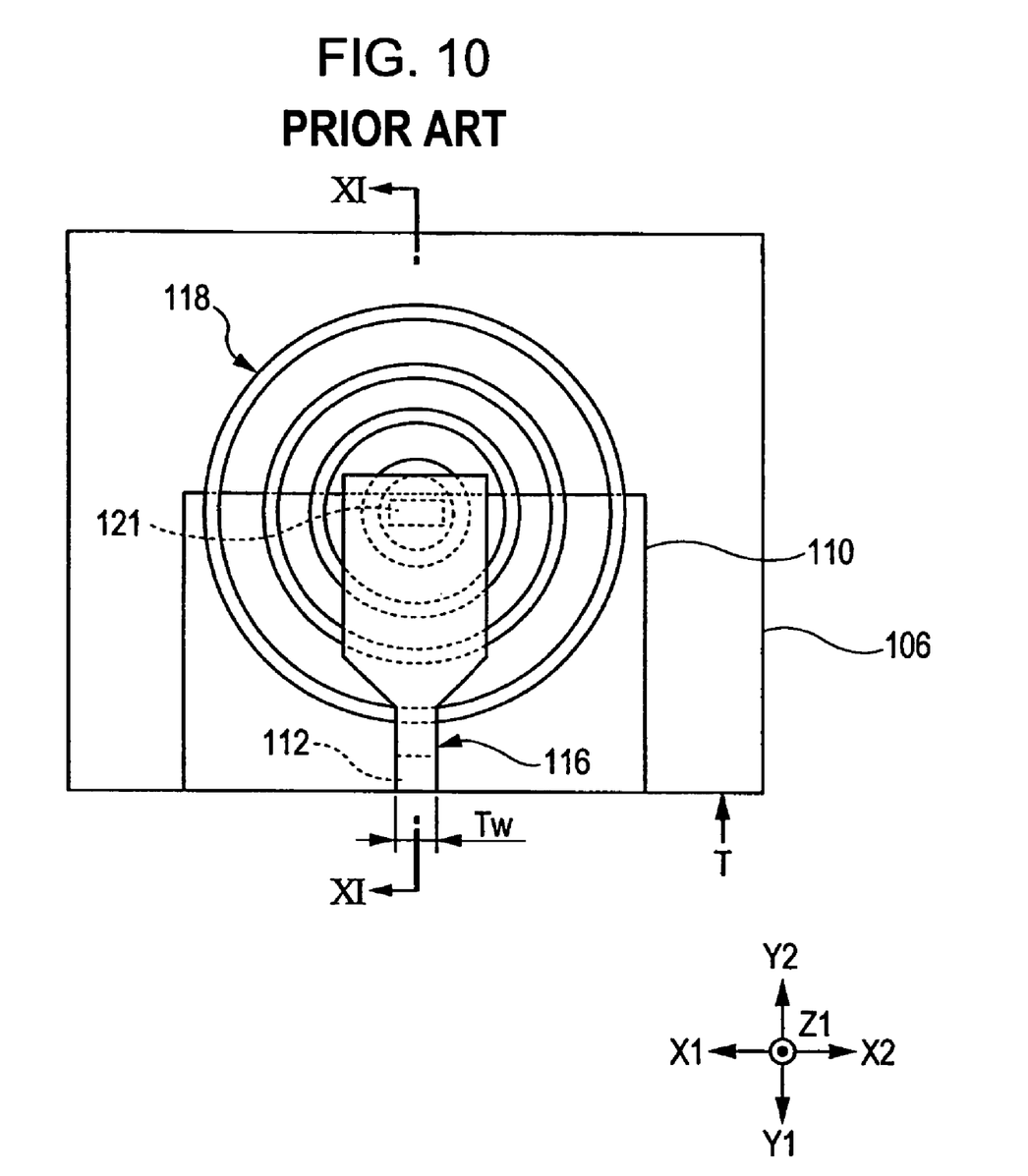
FIG. 10 is a partial plan view of a conventional magnetic head when viewed from above.
Figure 11:
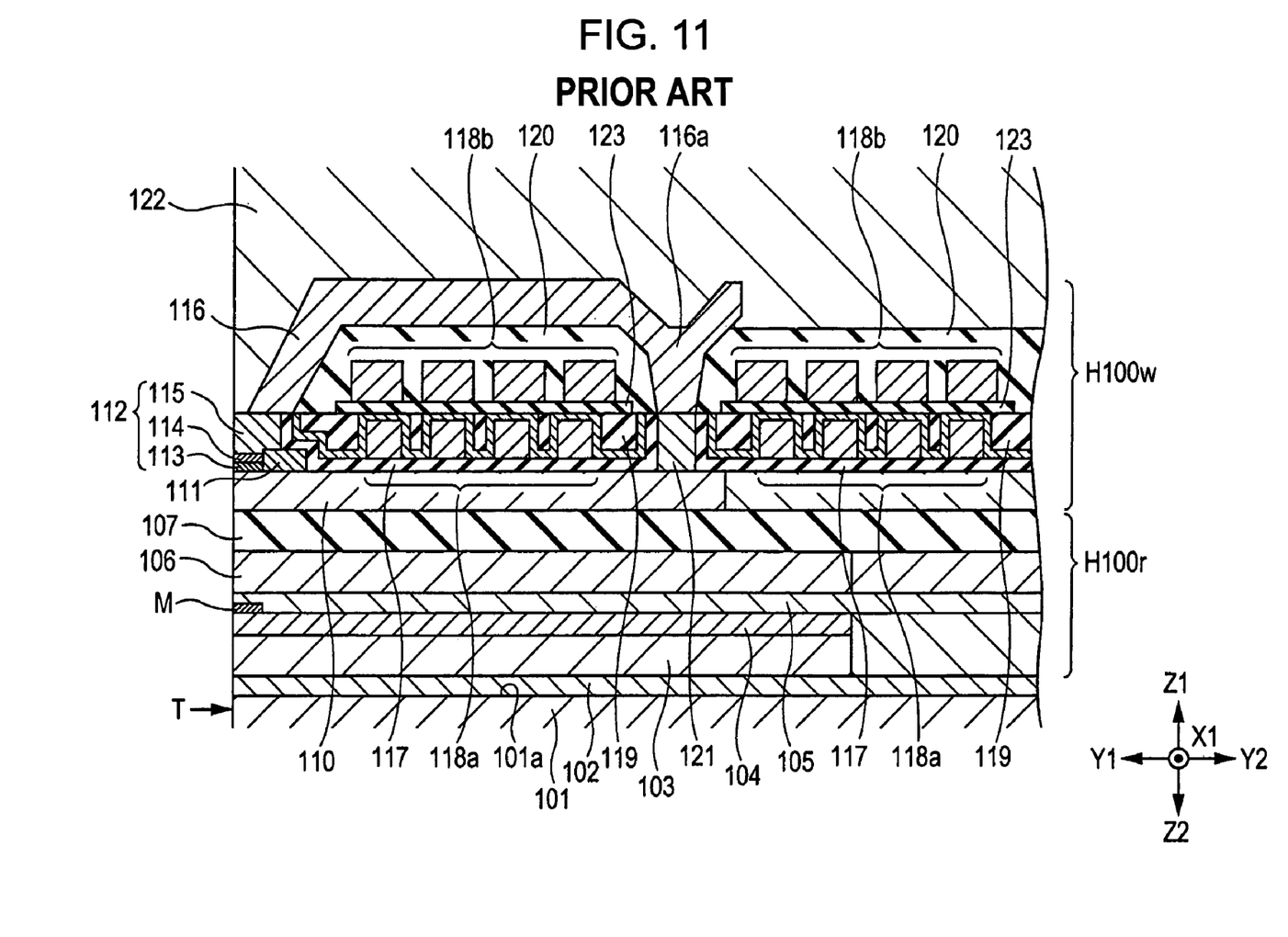
FIG. 11 is a sectional view taken along the line XI-XI in FIG. 10.

FIGS. 10 and 11 illustrate a conventional magnetic head H100, in which FIG. 10 is a partial plan view when viewed from above (from the Z1 direction in FIG. 10), and FIG. 11 is a sectional view thereof taken along the lines X1-X1 in FIG. 10 when viewed from the X2 direction in FIG. 10.

The magnetic head H100 illustrated in FIGS. 10 and 11 has a write magnetic head H100w which is an "inductive head". The write magnetic head H100w is arranged over a read magnetic head H100r utilizing, for example, a magnetoresistive effect.

The magnetic head H100 shown in FIGS. 10 and 11 is arranged over a trailing end 101a of a slider 101. The slider 101 contains a ceramic and constitutes a floating head.

The read magnetic head H100r is arranged over the trailing end 101a of the slider 101 with the interposition of an $Al_2O_3$ film 102. The read magnetic head H100r detects a magnetic field from a recording medium such as a hard disk utilizing the magnetoresistive effect and thereby reads out recording signals.

The read magnetic head H100r includes a lower shield layer 103, a lower gap layer 104, a magnetic read station M, an upper gap layer 105, and an upper shield layer 106 arranged in this order. The magnetic read station M is arranged partially between the lower gap layer 104 and the upper gap layer 105.

The lower gap layer 104 and the upper gap layer 105 each contain an insulating material such as $Al_2O_3$ or $SiO_2$. The lower shield layer 103 and the upper shield layer 106 each contain a soft magnetic material having a high magnetic permeability, such as a NiFe alloy (Permalloy).

A separating layer 107 containing an insulating material such as $Al_2O_3$ or $SiO_2$ is arranged over the upper shield layer 106, and the write magnetic head H100w is arranged over the separating layer 107.

A lower core layer 110 is arranged over the separating layer 107. A Gd-deciding layer 111 for deciding a gap depth (Gd) is arranged over the lower core layer 110.

A magnetic pole 112 extends from a side T facing a recording medium to the Gd-deciding layer 111.

The magnetic pole 112 includes a lower magnetic pole layer 113, a non-magnetic gap layer 114, and an upper magnetic pole layer 115 arranged in this order from the bottom. The upper magnetic pole layer 115 is magnetically connected to an upper core layer 116 arranged over the upper magnetic pole layer 115.

The upper magnetic pole layer 115 and the lower magnetic pole layer 113 each contain a soft magnetic material such as a NiFe alloy.

A coil insulating underlayer 117 is arranged over the lower core layer 110 toward the rear of the Gd-deciding layer 111 in a direction of height (the Y direction in FIGS. 10 and 11), and over the coil insulating underlayer 117 is arranged a first coil layer 118a in a helical pattern. The first coil layer 118a is made of an electrically conductive material such as Cu. A second coil layer 118b is arranged over the first coil layer 118a with the interposition of a coil insulating underlayer 123.

The first coil layer 118a and the second coil layer 118b constitute a coil layer 118. An insulating layer 119 is arranged around the first coil layer 118a, and an insulating layer 120 is arranged around the second coil layer 118b. These insulating layers are each made of an organic or inorganic insulating material.

The upper core layer 116 has a rear anchor 116a connected to the top of a connection layer 121. The connection layer 121 is arranged over the lower core layer 110 and is made of a magnetic material.

The upper core layer 116 and the lower core layer 110 are each typically formed from a NiFe alloy by plating.

A protective layer 122 made typically of alumina is arranged over the upper core layer 116.

When a recording current is supplied to the coil layer 118, a recording magnetic field is induced at the lower core layer 110 and the upper core layer 116. A leakage field is formed between the lower magnetic pole layer 113 and the upper magnetic pole layer 115 that face each other via the gap layer 114. Magnetic signals are recorded on a recording medium, such as a hard disk, by the action of the leakage field.

The magnetic head having the above structure is disclosed in Japanese Unexamined Patent Application Publication No. 2003-085710.

The conventional magnetic head H100 having the structure shown in FIGS. 10 and 11 disclosed in the publication undergoes an increasing write frequency and an increasing write current in the write magnetic head H100w with an increasing recording density employed in recent years.

With an increasing write frequency and an increasing power of write current in the write magnetic head H100w, Joule heat caused by such a high frequency and high power is produced in the upper shield layer 106 in the read magnetic head H100r, to thereby expand the upper shield layer 106. This results in stress upon the upper shield layer 106, which causes change in magnetic domains of the upper shield layer 106. Thus, the magnetic permeability of the upper shield layer 106 changes, resulting in stress applied upon the read magnetic head H100r.

Consequently, the output of the read magnetic head H100r changes between before and after the application of stress.

This phenomenon is called as write induced instability (WII). Recently, a recording magnetic field at a high frequency and/or a high power is applied to the write magnetic head as mentioned above. The magnetic head is therefore used in recording at a higher density, and the magnetic permeability in the upper shield layer 106 changes furthermore. Consequently, WII significantly affects the reproducing properties (output properties) of the read magnetic head H100r.

Accordingly, the change in magnetic domains of the upper shield layer 106 must be minimized even when a current at a high frequency and/or a high power is applied to the write magnetic head H100w.

In particular, the magnetic head H100 is frequently subjected to an acceleration test for determining magnetic properties of a magnetic detecting device 100 upon application of a current at a frequency and/or a power higher than those of a current applied to the write head in practical use. In this case, the read magnetic head H100r suffers from a higher stress, which causes significant changes in magnetic domains and in magnetic permeability of the upper shield layer 106. Thus, WII significantly occurs.

Strong demands have therefore been made to effectively reduce WII and appropriately minimize the change in magnetic domains of the upper shield layer 106 in the acceleration test.

Above-mentioned Japanese Unexamined Patent Application Publication No. 2003-085710, however, does not focus attention on reduction of WII and never teaches how the upper shield layer 106 is configured so as to reduce the change in magnetic domains even when a current at a high frequency and/or a high power is applied to the write magnetic head H100w.

Consequently, the magnetic head having the structure shown in FIGS. 10 and 11 disclosed in Japanese Unexamined Patent Application Publication No. 2003-085710 can neither reduce WII nor improve reproducing properties (output properties) of the read magnetic head H100r.

SUMMARY OF THE INVENTION

Accordingly, an object of the present invention is to solve the above problems and to provide a magnetic head capable of reducing WII and improving the reproducing properties of the read magnetic head H100r.

Specifically, the present invention provides a magnetic head including a write magnetic head and a read magnetic head, the write magnetic head containing a lower core layer, an upper core layer arranged over the lower core layer, and a coil layer for applying a magnetic field to the lower and upper core layers; and the read magnetic head containing an upper shield layer, a lower shield layer, and a reproducing device arranged between the upper shield layer and the lower shield layer, in which the upper shield layer has a dimension A in a direction of track width and a dimension B in a direction of height, the aspect ratio B/A of the upper shield layer is from 0.6 to 1.2, and the dimension A of the upper shield layer in a direction of track width is from 75 μm to 150 μm.

The magnetic head can be so configured that the lower core layer has a dimension C in a direction of track width and a dimension D in a direction of height, that the aspect ratio D/C of the lower core layer is from 0.6 to 1.2, and that the dimension C of the lower core layer in a direction of track width is from 75 μm to 150 μm.

In this case, the magnetic head is preferably so configured that the upper shield layer has an area S1 in its upper side, that the lower core layer has an area S2 in its lower side, and that the area ratio S2/S1 is from 0.90 to 1.0.

The magnetic head can be so configured that the lower shield layer has a dimension E in a direction of track width and a dimension F in a direction of height, that the aspect ratio F/E of the lower shield layer is from 0.6 to 1.2, and that the dimension E of the lower shield layer in a direction of track width is from 75 μm to 150 μm.

The upper shield layer preferably has a magnetostriction constant λ of –2 ppm to 0 ppm.

In this case, the upper shield layer can contain a NiFe alloy having an iron content of 18.6 percent by weight to 19.5 percent by weight.

The magnetic head is so configured that the upper shield layer has a dimension A in a direction of track width and a dimension B in a direction of height, and that the aspect ratio B/A of the upper shield layer is from 0.6 to 1.2.

In addition, the dimension A of the upper shield layer in a direction of track width should be from 75 μm to 150 μm.

When the aspect ratio of the upper shield layer is set within a range of 0.6 to 1.2 and the dimension A is set at 75 μm or more, the upper shield layer less expands even when Joule heat due to a current at a high frequency and/or a high power accompanied with a higher write frequency and/or a higher power of write current is produced in the upper shield layer. This reduces the stress upon the upper shield layer and the change in magnetic domains of the upper shield layer. Thus, the change in magnetic permeability of the upper shield layer is reduced, which reduces the stress upon the read magnetic head Hr.

Reduction in stress upon the read magnetic head Hr prevents the output of the read magnetic head Hr from changing between before and after the stress application.

By setting the dimension A of the upper shield layer at 150 μm or less, the magnetic head can suitably be designed as a floating magnetic head.

DESCRIPTION OF THE PREFERRED EMBODIMENTS

Figure 1:
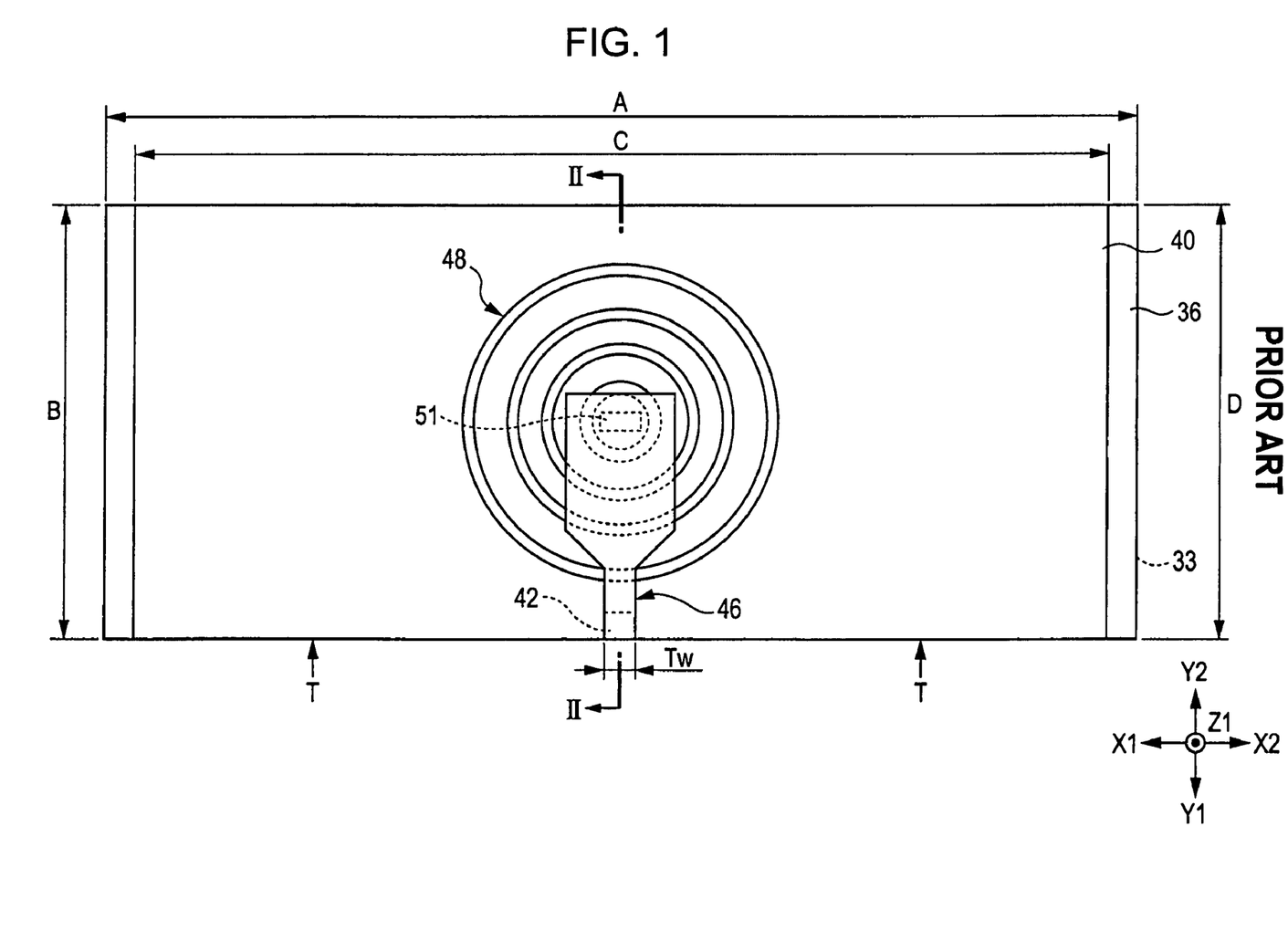
FIG. 1 is a partial plan view of a magnetic head H according to an embodiment of the present invention when viewed from above (the Z1 direction in the drawings)
Figure 2:
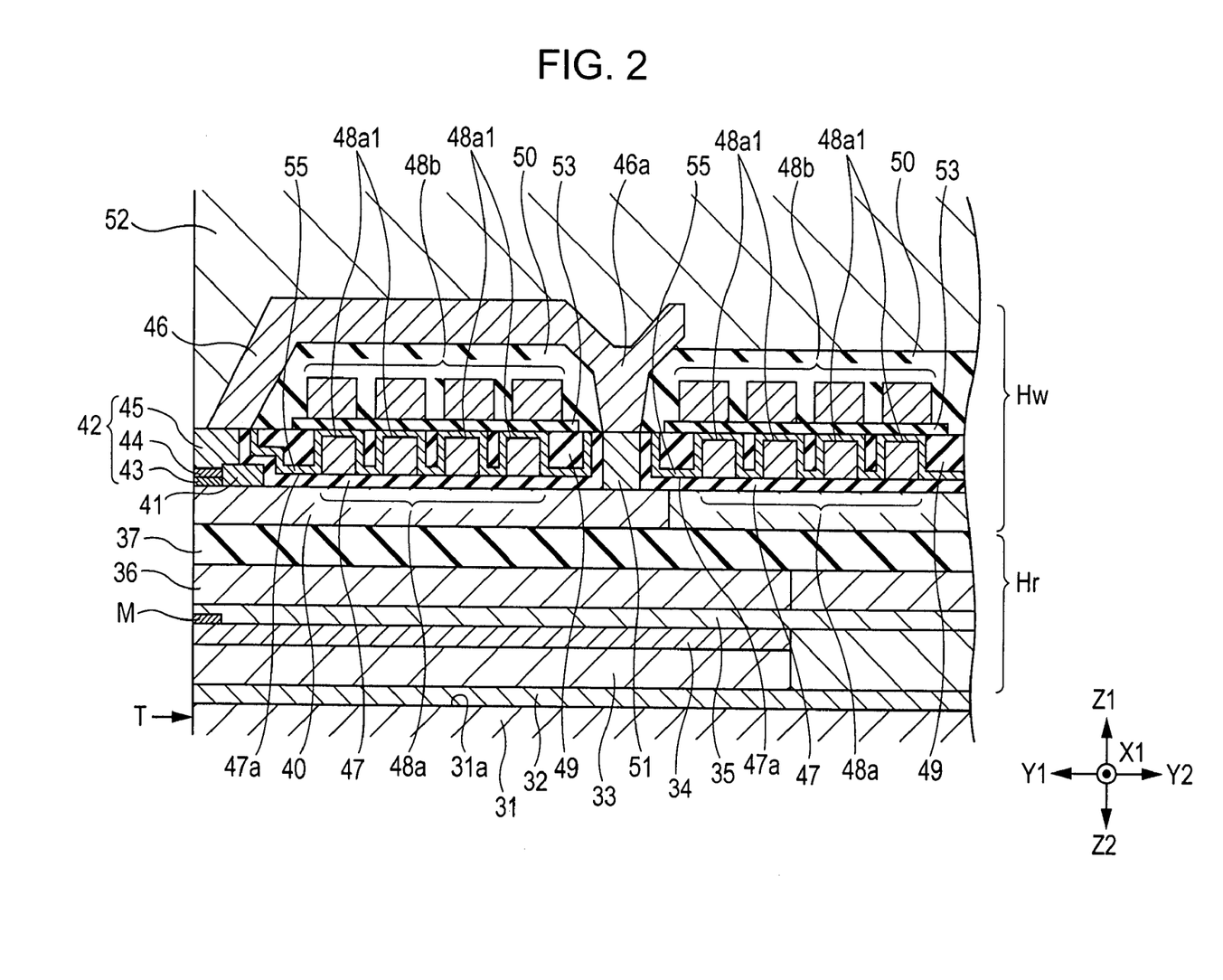
FIG. 2 is a partial longitudinal sectional view of the magnetic head H taken along the line II-II and viewed from the direction of the arrow in FIG. 1.
Figure 3:
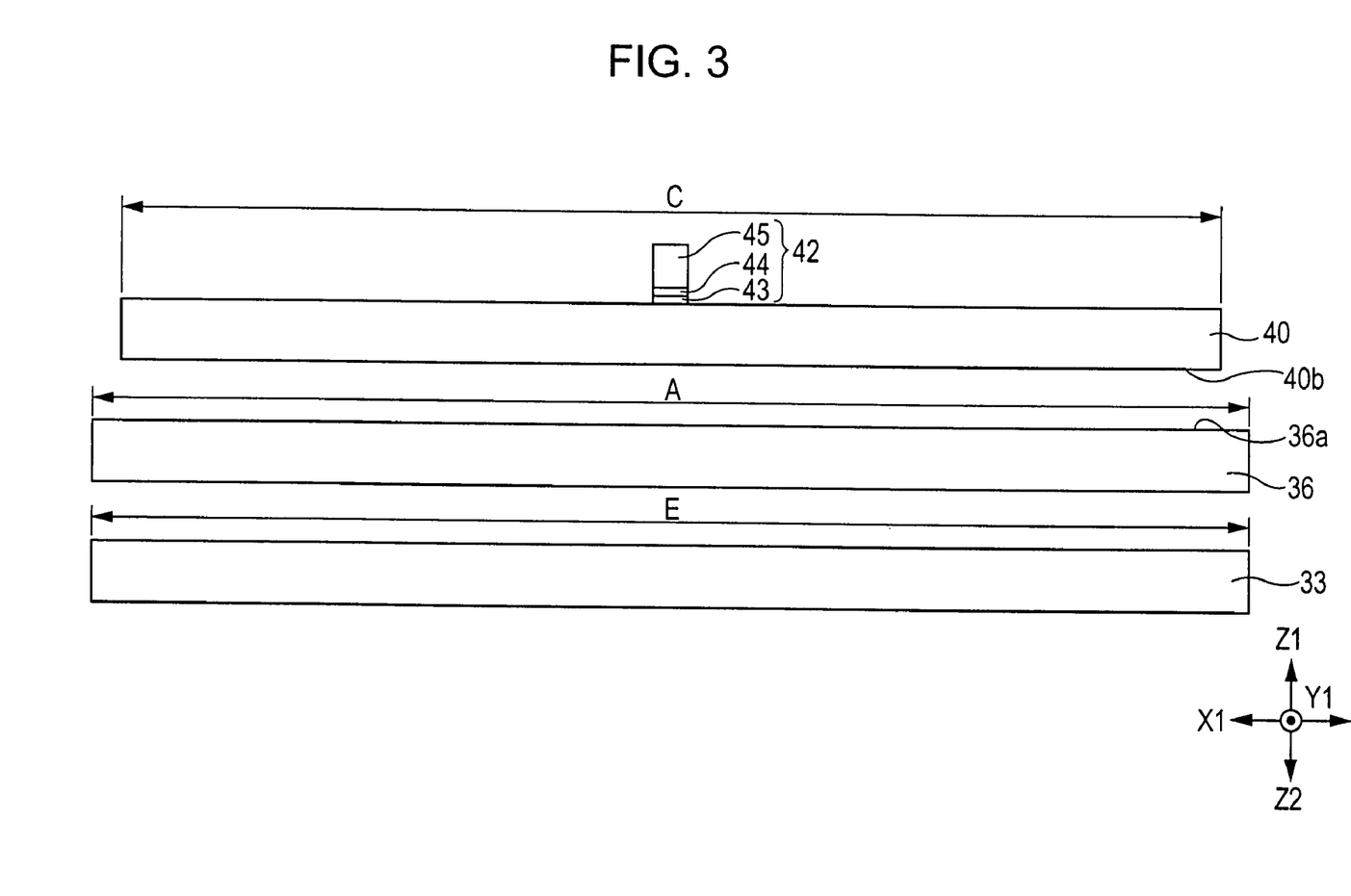
FIG. 3 is a partial elevational view of the magnetic head H of FIG. 1 when viewed from a side facing a recording medium (side T in FIG. 1)

FIGS. 1 to 3 are a partial plan view when viewed from above (in the Z1 direction in the drawings), a partial longitudinally sectional view taken along the line II-II and viewed form the X2 direction in the drawings, and a partial elevational view viewed from a side facing a recording medium (the side T in the drawings), respectively, of a magnetic head H according to an embodiment of the present invention. For the sake of easy understanding, a protective layer 52 illustrated in FIG. 2 is omitted in FIG. 1.

The magnetic head H of the present invention comprises a write magnetic head Hw for recording, namely, a so-called "recording magnetic head Hw" (FIG. 2). The write magnetic head Hw is arranged adjacent to (over) a read magnetic head Hr utilizing, for example, a magnetoresistive effect.

The magnetic head H illustrated in FIGS. 1 and 2 is arranged over a trailing end 31a of a slider 31 being made of a ceramic and constituting a floating head. These write magnetic head Hr and write magnetic head Hw are stacked to constitute a composite thin film magnetic head.

The read magnetic head Hr is arranged over the trailing end 31a of the slider 31 with the interposition of an $Al_2O_3$ film 32 (FIGS. 1 and 2). The read magnetic head Hr detects a leakage magnetic field from a recording medium such as a hard disk utilizing the magnetoresistive effect and thereby reads out recording signals.

The read magnetic head Hr comprises a lower shield layer 33, a lower gap layer 34, a magnetic read station M, an upper gap layer 35, and an upper shield layer 36 arranged in this order. The magnetic read station M is arranged partially between the lower gap layer 34 and the upper gap layer 35. The magnetic read station M is a magnetoresistive device such as a giant magnetoresistive (GMR) device utilizing a giant magnetoresistive effect and typified by a spin-valve film, a tunneling magnetoresistive (TMR) device utilizing a tunneling magnetoresistive effect, or an anisotropic magnetoresistive (AMR) device utilizing an anisotropic magnetoresistive effect.

The dimension (length) of the magnetic read station M in a direction of track width (in the X direction) is a track width Tr of the read magnetic head Hr.

The lower gap layer 34 and the upper gap layer 35 are each made of an insulating material such as $Al_2O_3$ or $SiO_2$. The lower shield layer 33 and the upper shield layer 36 are each made of a soft magnetic material having a high magnetic permeability, such as a NiFe alloy (Permalloy).

A separating layer 37 made of an insulating material such as $Al_2O_3$ or $SiO_2$ is arranged over the upper shield layer 36, and the write magnetic head Hw is arranged over the separating layer 37.

A lower core layer 40 is arranged over the separating layer 37. The lower core layer 40 is made of a magnetic material such as a NiFe alloy, has a predetermined length and extends from the side T facing the recording medium to the height direction (the Y direction in the drawings).

A Gd-deciding layer 41 for deciding a gap depth (Gd) is arranged over the lower core layer 40.

A magnetic pole 42 is arranged so as to extend from the side T facing the recording medium to the Gd-deciding layer 41. The magnetic pole 42 has a width in a direction of track width (the X1-X2 direction in the drawings) constituted by the track width Tw. The track width Tw is set at, for example, about 0.1 µm to about 1.0 µm.

The magnetic pole 42 comprises a lower magnetic pole layer 43, a non-magnetic gap layer 44, and an upper magnetic pole layer 45 arranged in this order from the bottom. The upper magnetic pole layer 45 is magnetically connected to an upper core layer 46 arranged over the upper magnetic pole layer 45.

The upper magnetic pole layer 45 and the lower magnetic pole layer 43 may each comprise one or more soft magnetic materials shown by compositional formulae of NiFe, CoFe, FeCoNi, CoFeX and FeNiX where X is at least one element selected from the group consisting of Pd, Ir, Rh, Ru and Pt.

The upper magnetic pole layer 45 and the lower magnetic pole layer 43 preferably each comprise a soft magnetic material having a saturation magnetic flux density higher than that of the lower core layer 40 and the upper core layer 46.

When the upper magnetic pole layer 45 and the lower magnetic pole layer 43 arranged near to the gap layer 44, each comprise a magnetic material having a high saturation magnetic flux density, they accelerate the magnetic flux passed from the upper core layer 46 and the lower core layer 40 to focus in the vicinity of the gap, to thereby increase the recording density.

The gap layer 44 arranged over the lower magnetic pole layer 43 can comprise one or more materials selected from the group consisting of NiP, NiPd, NiPt, NiRh, NiW, NiMo, Au, Pt, Rh, Pd, Ru, Cr, Ag, Cu and Ti. The gap layer 44 can be any of a single-layer film and a multi-layer film.

The lower magnetic pole layer 43 is formed by plating over the lower core layer 40. The gap layer 44 arranged over the lower magnetic pole layer 43 preferably comprises at least one non-magnetic metal material that can form a film by plating. This enables continuous formation of the lower magnetic pole layer 43, the gap layer 44 and the upper magnetic pole layer 45 by plating.

A coil insulating underlayer 47 is arranged over the lower core layer 40 toward the rear of the Gd-deciding layer 41 in a direction of height (the Y direction in the drawings), and over the coil insulating underlayer 47 is arranged a first coil layer 48a in a helical pattern. The first coil layer 48a is made of an electrically conductive material such as Cu or Au that features low electric resistance. A second coil layer 48b is arranged over the first coil layer 48a with the interposition of a coil insulating underlayer 53.

The first coil layer 48a and the second coil layer 48b constitute a coil layer 48. For the sake of easy understanding, the coil layer 48 is illustrated as circles in FIG. 1. The actual coil layer 48, however, is helically arranged around a connection layer 51 mentioned below.

An insulating layer 49 is arranged around the first coil layer 48a, and an insulating layer 50 is arranged around the second coil layer 48b. The insulating layers 49 and 50 each comprise an organic insulating material such as a resist, or an inorganic material such as $Al_2O_3$.

The coil layer 48 is not specifically limited to a multi-layer coil layer comprising two or more layers and can be a single-layer coil layer.

The upper core layer 46 has a rear anchor 46a magnetically connected to the top of a connection layer 51. The connection layer 51 is arranged over the lower core layer 40 and comprises a magnetic material. Thus, the lower core layer 40 and the upper core layer 46 are magnetically connected.

The lower core layer 40 and the upper core layer 46 are each formed typically by plating of a NiFe alloy.

The connection layer 51 can comprise a material the same as or different from that of the lower core layer 40. The connection layer 51 can be a single layer or a multi-layer.

A coil insulating underlayer 47 is arranged in a space surrounded by the lower core layer 40 and the connection layer 51. The coil insulating underlayer 47 comprises a material having a polishing rate higher than that of a first material layer 55 mentioned below. For example, the coil insulating underlayer 47 may comprise an insulating material such as $Al_2O_3$. The first coil layer 48a is arranged in a helical pattern around the connection layer 51 over the coil insulating underlayer 47.

The first material layer 55 made typically of $SiO_2$ extends from a top 48a1 and side 48a2 of the first coil layer 48a to a top 47a of the coil insulating underlayer 47.

The first material layer 55 is thus arranged over the first coil layer 48a, and the second coil layer 48b is arranged over the first material layer 55 with the interposition of the coil insulating underlayer 53.

The first coil layer 48a and the second coil layer 48b constitute the coil layer 48. The first and second coil layers 48a and 48b each comprise an electrically conductive material such as Cu. An insulating layer 49 is arranged around the first coil layer 48a, and an insulating layer 50 is arranged around the second coil layer 48b. These insulating layers are each made of an organic or inorganic insulating material.

A protective layer 52 made typically of alumina is arranged over the upper core layer 46.

When a recording current is supplied to the coil layer 48, a recording magnetic field is induced at the lower core layer 40 and the upper core layer 46. A leakage field is formed between the lower magnetic pole layer 43 and the upper magnetic pole layer 45 that face each other via the gap layer 44. Magnetic signals are recorded on a recording medium, such as a hard disk, by the action of leakage field.

Features of the present invention will be illustrated below.

With reference to FIGS. 1 and 2, the magnetic head H is so configured that the upper shield layer 36 has a dimension A in a direction of track width (the dimension in the X1-X2 direction in FIGS. 1 and 3) and a dimension B in a direction of height, i.e., in the vertical direction (the dimension in the Y1-Y2 direction in FIGS. 1 and 3), and the aspect ratio B/A is set at 0.6 to 1.2.

In addition to the above requirement in aspect ratio, the dimension A of the upper shield layer 36 is set within a range of 75 µm to 150 µm.

By setting the aspect ratio of the upper shield layer 36 at 0.6 to 1.2 and the dimension A thereof at 75 µm or more, the upper shield layer 36 less expands even when Joule heat is produced in the upper shield layer 36 due to a current at a high frequency and/or a high power accompanied with a higher frequency and a higher power of write current. This reduces the stress upon the upper shield layer 36 and the change in magnetic domains of the upper shield layer 36. Thus, the change in magnetic permeability of the upper shield layer 36 is reduced, which reduces the stress upon the read magnetic head Hr.

Reduction in stress upon the read magnetic head Hr prevents the output of the read magnetic head Hr from changing between before and after the stress application.

The phenomenon in which the output of the read magnetic head Hr changes between before and after stress application is called as write induced instability (WII). Recently, a recording magnetic field at a high frequency and/or a high power is applied to the write magnetic head Hw. Thus, the magnetic head undergoes higher density in recording, and the magnetic permeability in the upper shield layer 36 changes further more. Consequently, WII significantly affects the reproducing properties (output properties) of the read magnetic head Hr.

Accordingly, the change in magnetic domains of the upper shield layer 36 must be minimized even when a current at a high frequency and/or a high power is applied to the write magnetic head Hw. The magnetic head of the present invention has an aspect ratio and a dimension A in the direction of track width of the upper shield layer 36 within the above-specified ranges and thereby enables reduction of the change in magnetic permeability of the upper shield layer 36 to thereby reduce WII even when a current at a high frequency and/or a high power is applied to the write magnetic head Hw.

If the dimension A exceeds 150 µm, the magnetic head H becomes excessively big and becomes difficult to be designed as a floating magnetic head. Specifically, a rail is arranged on a side of the magnetic head H facing a recording medium for the purpose typically of stabilizing the attitude of such a floating magnetic head, and the upper shield layer 36 is preferably designed so as to match the dimensions of the rail. If the upper shield layer 36 is excessively large, the rail must have a large width, which increases the size (dimensions) of the magnetic head H. Such an excessively large magnetic head is difficult to be used as a floating magnetic head.

With reference to FIGS. 1 and 3, the lower shield layer 33 preferably has the same dimensions (size) as the upper shield layer 36. Namely, when the lower shield layer 33 has a dimension E in a direction of track width (the dimension in the X1-X2 direction in FIGS. 1 and 3) and a dimension F in a direction of height (the dimension in the Y1-Y2 direction in FIGS. 1 and 3), the aspect ratio F/E is preferably 0.6 to 1.2.

In addition to the preferred configuration in aspect ratio, the dimension E of the lower shield layer 33 is preferably within a range of 75 µm to 150 µm.

This configuration is preferred to ensure symmetry in magnetoresistance curve (a curve showing the relationship between the output and the applied magnetic field, namely, a QST curve) of the read magnetic head Hr.

The magnetic head H is preferably so configured that the lower core layer has a dimension C in a direction of track width (the dimension in the X1-X2 direction in FIGS. 1 and 3) and a dimension D in a direction of height (the dimension in the X1-X2 direction in FIGS. 1 and 3), that the aspect ratio D/C of the lower core layer is from 0.6 to 1.2, and that the dimension C of the lower core layer in a direction of track width is from 75 µm to 150 µm.

The magnetic head H preferably has an area ratio S2/S1 of 0.90 to 1.0, wherein S1 is the area of the upper side 36a of the upper shield layer 36; and S2 is the area of the lower side 40b of the lower core layer 40.

By setting the area ratio S2/S1 at 0.90 or less, the lower core layer 40 can have a relatively large volume and thereby reduce the change in magnetic domains of the lower core layer 40 even if a current at a high frequency and/or a high power is applied to the write magnetic head Hw. This reduces the stress applied on the read magnetic head Hr and thereby minimize WII. If the area ratio S2/S1 exceeds 1.0, a flat surface flush with the upper side 36a of the upper shield layer 36 must be formed typically of an insulating material to support a portion of the lower core layer 40 that extends off the upper side 36a of the upper shield layer 36. This complicates production processes and increases the number thereof, inviting decreased production efficiency.

In this case, an area ratio S2/S3 is preferably set within a range of 0.90 to 1.0, where S2 is the area of the lower side 40b of the lower core layer 40, and S3 is the area of the upper side 33a of the lower shield layer 33. This enables a larger volume of the lower shield layer 33 and thereby further effectively reduces WII.

The upper shield layer 36 preferably has a magnetostriction constant λ of −2 ppm to 0 ppm for reducing WII. In addition, the lower shield layer 33 also preferably has a magnetostriction constant λ of −2 ppm to 0 ppm for further effectively reducing WII.

When the upper shield layer 36 and/or the lower shield layer 33 comprises a NiFe alloy (Permalloy), the iron content in the NiFe alloy is preferably from 18.6 percent by weight to 19.5 percent by weight for achieving a magnetostriction constant λ within a range of −2 ppm to 0 ppm.

The present invention will be illustrated in further detail with reference to several examples below, which by no means restricts the scope of the present invention.

TEST EXAMPLE 1

Figure 4:
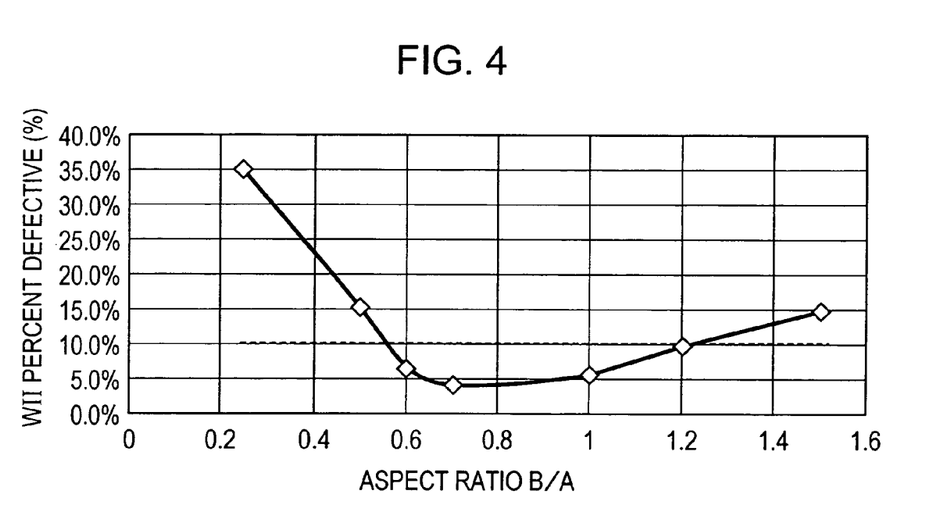
FIG. 4 is a graph of WII percent defectives plotted against the aspect ratio of an upper shield layer.

A series of magnetic heads having the configuration shown in FIGS. 1 to 3 was prepared. FIG. 4 is a graph of WII percent defectives plotted against the aspect ratio (the aspect ratio B/A in the dimensions A and B in FIG. 1) of an upper shield layer of the prepared magnetic heads.

The magnetic heads used in the measurement in FIG. 4 each had a constant dimension of 100 µm of the upper shield layer in a direction of track width (corresponding to the dimension A in FIG. 1). In the test, a current at a frequency of 380 MHz was applied to the write magnetic head Hw. A sample magnetic head showing a change in output of the write magnetic head Hr of 10% or more between before and after the application is evaluated as a defect with WII.

FIG. 4 shows that the WII percent defective can be reduced to 10% or less by setting the aspect ratio B/A within a range of 0.6 to 1.2.

Figure 5:
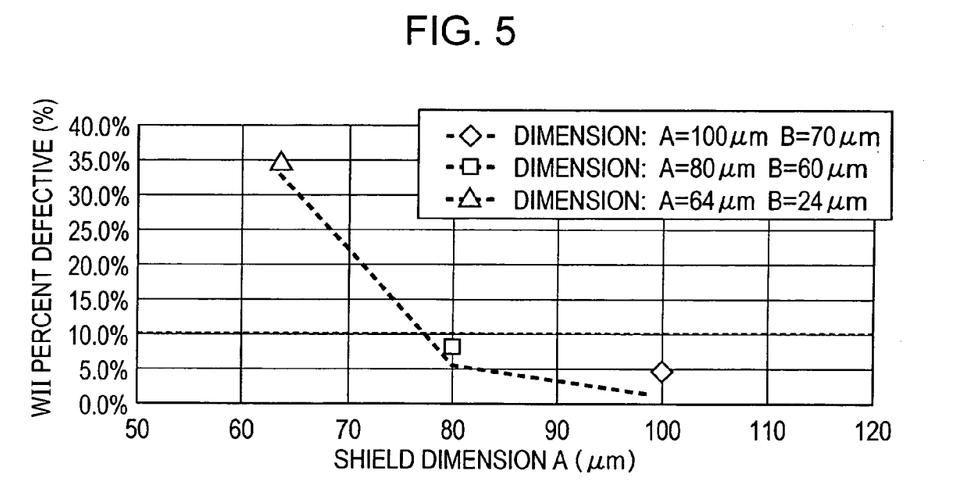
FIG. 5 is a graph of WII percent defectives plotted against the dimension A of the upper shield layer in a direction of track width.

Another series of magnetic heads having the configuration shown in FIGS. 1 to 3 was prepared. FIG. 5 is a graph of WII percent defectives plotted against the dimension A (FIG. 1) in a direction of track width of the upper shield layer of the prepared magnetic heads.

The magnetic heads used in the test in FIG. 5 have a dimension A in a direction of track width and a dimension B in a direction of height of the upper shield layer (A by B), and a dimension E in a direction of track width and a dimension F in a direction of height of the lower shield layer (E by F), of 100 µm by 70 µm, 80 µm by 60 µm, and 64 µm by 24 µm, respectively. The WII percent defectives of these magnetic heads were determined.

FIG. 5 demonstrates that the WII percent defective can be reduced to 10% or less by setting the dimension A in a direction of track width of the upper shield layer at 75 µm or more.

Figure 6:
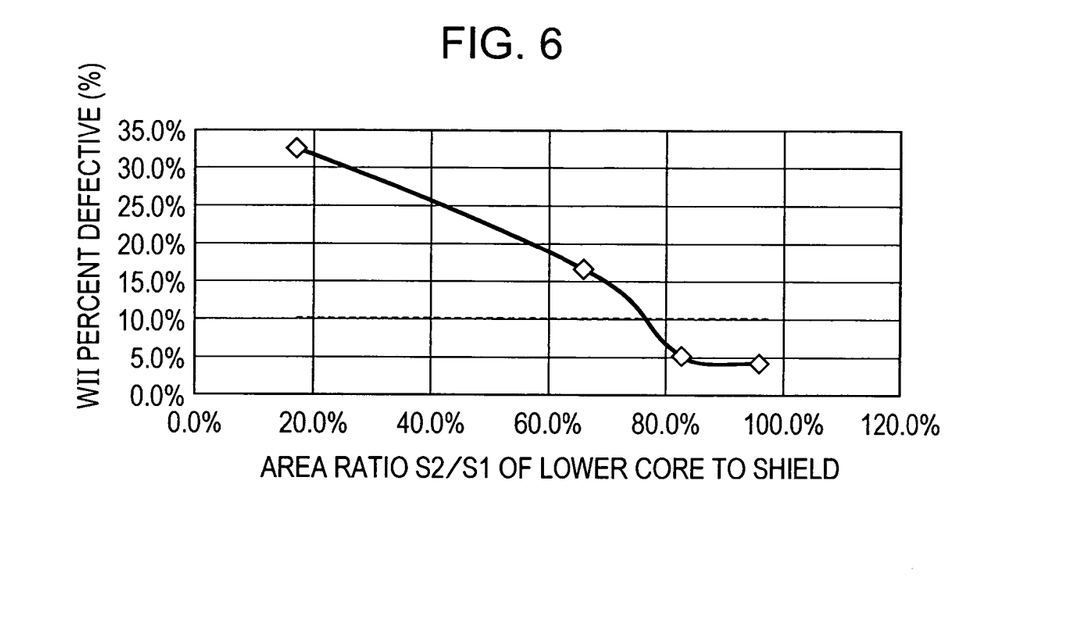
FIG. 6 is a graph of WII percent defectives plotted against the area ratio of the upper shield layer to the lower core layer.

Yet another series of magnetic heads having the configuration shown in FIGS. 1 to 3 was prepared. FIG. 6 is a graph of WII percent defectives plotted against the area ratio of the lower core layer to the upper core layer.

In the test in FIG. 6, the upper shield layer had constant dimensions (the dimensions A by B in FIG. 1) of 100 µm by 70 µm so that the area S1 of the upper side of the upper shield layer (FIG. 1) was set constant. The area S2 of the lower side of the lower core layer was varied by setting the dimensions (the dimensions C by D in FIG. 1) of the lower core layer at 60 µm by 20 µm, 94 µm by 48 µm, 96 µm by 60 µm, or 96 µm by 70 µm.

FIG. 6 demonstrates that the WII percent defective can be reduced to 10% or less by setting the area ratio S2/S1 at 0.90 or more.

Figure 7:
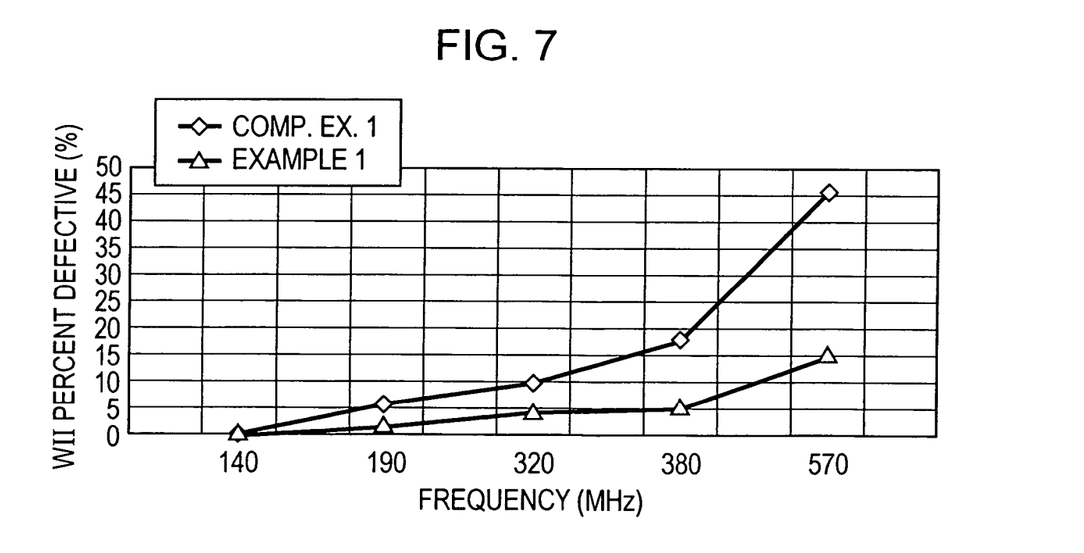
FIG. 7 is a graph of WII percent defectives plotted against the frequency applied to a write magnetic head.

Another series of magnetic heads having the configuration shown in FIGS. 1 to 3 was prepared. FIG. 7 is a graph of WII percent defectives plotted against the frequency of a current applied to the write magnetic head Hw.

In the graph in FIG. 7, the upper shield layer of a sample magnetic head according to Comparative Example 1 has a dimension A in a direction of track width and a dimension B in a direction of height of 64 µm and 24 µm, respectively, with an aspect ratio B/A of 0.38. The upper shield layer of a sample magnetic head according to Example 1 has a dimension A in a direction of track width and a dimension B in a direction of height of 100 µm and 70 µm, respectively, with an aspect ratio B/A of 0.7. Both the magnetic heads according to Comparative Example 1 and Example 1 had a magnetostriction constant λ of −2.5 ppm.

FIG. 7 demonstrates that the magnetic head according to Example 1 shows a WII percent defective lower than that of the magnetic head according to Comparative Example 1 when a current at a high frequency is applied to the write magnetic head Hw.

Figure 8:
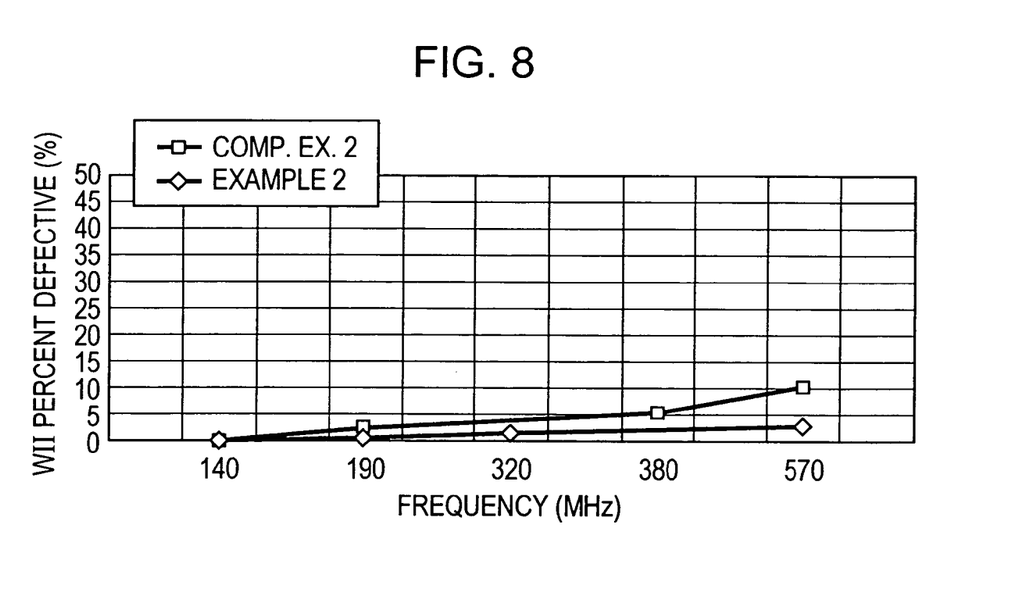
FIG. 8 is a graph of WII percent defectives plotted against the frequency applied to a write magnetic head.

Yet another series of magnetic heads having the configuration shown in FIGS. 1 to 3 was prepared. FIG. 8 is a graph of WII percent defectives plotted against the frequency of a current applied to the write magnetic head Hw.

In the graph in FIG. 8, the upper shield layer of a sample magnetic head according to Comparative Example 2 has a dimension A in a direction of track width and a dimension B in a direction of height of 64 µm and 24 µm, respectively, with an aspect ratio B/A of 0.38. The upper shield layer of a sample magnetic head according to Example 2 has a dimension A in a direction of track width and a dimension B in a direction of height of 100 µm and 70 µm, respectively, with an aspect ratio B/A of 0.7. These parameters are the same as in FIG. 7, except that both the magnetic heads according to Comparative Example 2 and Example 2 have a magnetostriction constant λ of −1.0 ppm.

FIG. 8 demonstrates that the magnetic head according to Example 2 has a WII percent defective lower than that of the magnetic head according to Comparative Example 2 when a current at a high frequency is applied to the write magnetic head Hw.

The comparison between the results in FIG. 7 and FIG. 8 demonstrates that the magnetic head having a magnetostriction constant λ of the upper shield layer of −1.0 ppm (Example 2) shows a lower WII percent defective than the magnetic head having a magnetostriction constant λ of the upper shield layer of −2.5 ppm (Example 2) when a current at a high frequency is applied to the write magnetic head Hw.

Figure 9:
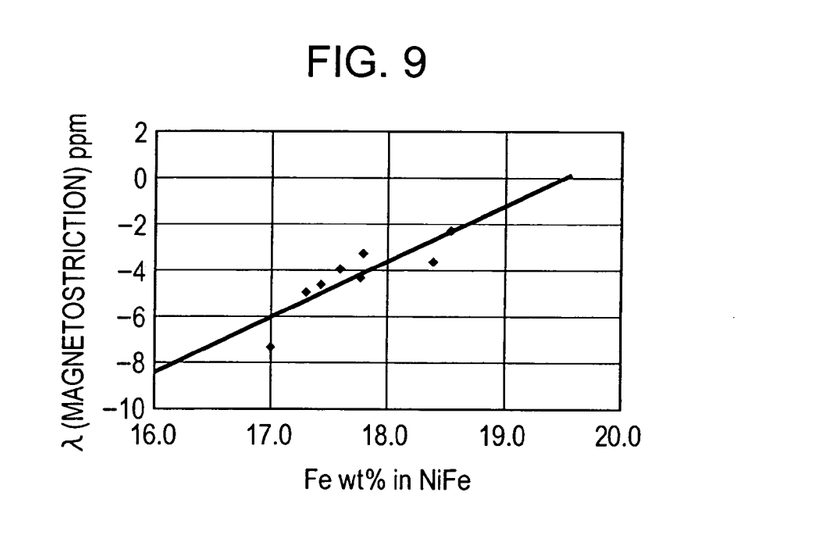
FIG. 9 is a graph of magnetostriction constants λ plotted against the Fe content in an upper shield layer made of a NiFe alloy.

Another series of magnetic heads having the configuration shown in FIGS. 1 to 3, in which the upper shield layer was made of a NiFe alloy, was prepared. FIG. 9 is a graph of magnetostriction constant λ plotted against the Fe content in the NiFe alloy constituting the upper shield layer.

FIG. 9 demonstrates that the magnetostriction constant λ can be set within a range of −2 ppm to 0 ppm by setting the Fe content in the NiFe alloy at 18.6 percent by weight to 19.5 percent by weight.

What is claimed is:

1. A magnetic head comprising:
   a write magnetic head comprising:
      a lower core layer,
      an upper core layer arranged over the lower core layer, and
      a coil layer for applying a magnetic field to the lower and upper core layers; and
   a read magnetic head comprising:
      an upper shield layer,
      a lower shield layer, and
      a reproducing device arranged between the upper shield layer and the lower shield layer,
      wherein the upper shield layer has a dimension A in a direction of track width and a dimension B in a direction of height,
      wherein the aspect ratio B/A of the upper shield layer is from 0.6 to 1.2, and
      wherein the dimension A of the upper shield layer in a direction of track width is from 75 µm to 150 µm.

2. The magnetic head according to claim 1,
   wherein the lower core layer has a dimension C in a direction of track width and a dimension D in a direction of height,
   wherein the aspect ratio D/C of the lower core layer is from 0.6 to 1.2, and wherein the dimension C of the lower core layer in a direction of track width is from 75 μm to 150 μm.

3. The magnetic head according to claim 1,
wherein the upper shield layer has an upper side with an area S1,
wherein the lower core layer has a lower side with an area S2, and
wherein the area ratio S2/S1 is from 0.90 to 1.0.

4. The magnetic head according to claim 1,
wherein the lower shield layer has a dimension E in a direction of track width and a dimension F in a direction of height,
wherein the aspect ratio F/E of the lower shield layer is from 0.6 to 1.2, and
wherein the dimension E of the lower shield layer in a direction of track width is from 75 μm to 150 μm.

5. The magnetic head according to claim 1, wherein the upper shield layer has a magnetostriction constant $\lambda$ of $-2$ ppm to 0 ppm.

6. The magnetic head according to claim 1, wherein the upper shield layer comprises a NiFe alloy having an Fe content of 18.6 percent by weight to 19.5 percent by weight.

* * * * *